US011910413B2

(12) United States Patent
Sundararajan et al.

(10) Patent No.: US 11,910,413 B2
(45) Date of Patent: Feb. 20, 2024

(54) TRAFFIC-AWARE CHANNEL STATE INFORMATION FEEDBACK

(71) Applicant: QUALCOMM INCORPORATED, San Diego, CA (US)

(72) Inventors: Jay Kumar Sundararajan, San Diego, CA (US); Prashanth Haridas Hande, San Diego, CA (US); Wanshi Chen, San Diego, CA (US); Yeliz Tokgoz, San Diego, CA (US); Naga Bhushan, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 17/249,404

(22) Filed: Mar. 1, 2021

(65) Prior Publication Data

US 2021/0282145 A1    Sep. 9, 2021

Related U.S. Application Data

(60) Provisional application No. 62/985,246, filed on Mar. 4, 2020.

(51) Int. Cl.
*H04W 72/52* (2023.01)
*H04L 5/00* (2006.01)
*H04W 24/10* (2009.01)
*H04L 1/00* (2006.01)

(52) U.S. Cl.
CPC ........... *H04W 72/52* (2023.01); *H04L 1/0058* (2013.01); *H04L 5/001* (2013.01); *H04W 24/10* (2013.01)

(58) Field of Classification Search
None
See application file for complete search history.

(56) References Cited

U.S. PATENT DOCUMENTS

| 8,675,974 | B2* | 3/2014 | Iio | G06F 18/23213 |
| | | | | 382/190 |
| 8,982,803 | B1* | 3/2015 | Zhang | H04L 1/0026 |
| | | | | 370/329 |
| 2011/0237283 | A1* | 9/2011 | Shan | H04L 5/0091 |
| | | | | 455/509 |

(Continued)

*Primary Examiner* — Christopher M Crutchfield
(74) *Attorney, Agent, or Firm* — Haynes and Boone, LLP

(57) ABSTRACT

Wireless communication devices, systems, and methods relate to selecting transmission parameters that optimize a dimension (e.g., time, frequency, and/or spatial) under a set of constraints. A UE may receive a resource allocation mode indication and a traffic parameter indication from a BS. The resource allocation mode indication informs the UE to optimize along a time dimension, a frequency dimension, and/or a spatial domain. The traffic parameter indication informs the UE what constraints to consider for the transmission parameters. The UE may use this information upon receipt of a reference signal in selecting transmission parameters based on the received reference signal, resource allocation mode indication, and traffic parameter indication. The resource allocation mode may correspond to optimization within a single slot or across multiple slots. Once selected, the UE may transmit the transmission parameters to the BS for use in sending the message to the UE.

30 Claims, 6 Drawing Sheets

(56) References Cited

U.S. PATENT DOCUMENTS

| | | | | |
|---|---|---|---|---|
| 2013/0286877 A1* | 10/2013 | Chung | .............. | H04W 36/0085 |
| | | | | 370/252 |
| 2016/0323426 A1* | 11/2016 | Hedayat | ............ | H04W 28/0268 |
| 2021/0385818 A1* | 12/2021 | Levitsky | .............. | H04W 72/569 |
| 2022/0255778 A1* | 8/2022 | Paz | ..................... | H04L 25/4917 |
| 2023/0006762 A1* | 1/2023 | Levitsky | ............... | H04L 5/0023 |
| 2023/0059750 A1* | 2/2023 | Beale | .................... | H04L 1/0026 |
| 2023/0097142 A1* | 3/2023 | Alfarhan | .............. | H04L 5/0051 |
| | | | | 370/329 |

\* cited by examiner

TRAFFIC-AWARE CHANNEL STATE INFORMATION FEEDBACK

CROSS REFERENCE TO RELATED APPLICATIONS

The present application claims priority to and the benefit of U.S. Provisional Patent Application No. 62/985,246, filed Mar. 4, 2020, which is hereby incorporated by reference in its entirety as if fully set forth below and for all applicable purposes.

TECHNICAL FIELD

This application relates to wireless communication systems, and more particularly to methods (and associated devices and systems) for wireless communications devices to determine and communicate transmission configuration parameters based on various indicated targets and constraints.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE).

Prior to transmitting a message to a UE, a base station (BS) may request that a UE provide the BS with recommended transmission parameters for the BS to use when transmitting the message. The BS may transmit a reference signal to the UE, which the UE may use for channel estimation. Based on the channel estimation, the UE may determine transmission parameters acceptable for data transmissions by the BS to the UE, and may communicate the parameters as part of a channel state feedback (CSF) report. The UE may select the transmission parameters that maximize the payload size—or number of bits—that can be transmitted in a single time frame or slot. Maximizing the payload size, however, may not always be an ideal strategy.

For example, maximizing the payload size for a small message would be wasteful, as it may require padding unused resource blocks that could be used for other messages. Similarly, other messages may have more urgent deadlines than the one under consideration, making it a better solution to free resource blocks for use by those messages by selecting a smaller payload size. Thus, there is a need to provide wireless communications devices with a mechanism for determining transmission parameters that satisfy varying objectives under a given set of constraints.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communications device, a resource allocation mode indication from a second wireless communications device. The method further includes receiving, by the first wireless communications device, a traffic parameter indication from the second wireless communications device. The method further includes selecting, by the first wireless communications device, a transmission parameter based on a reference signal, the resource allocation mode indication, and the traffic parameter indication. The method further includes transmitting, by the first wireless communications device, the transmission parameter to the second wireless communications device as part of a channel state feedback message.

In an additional aspect of the disclosure, a method of wireless communication includes transmitting, by a first wireless communications device, a resource allocation mode indication to a second wireless communications device. The method further includes transmitting, by the first wireless communications device, a traffic parameter indication to the second wireless communications device. The method further includes transmitting, by the first wireless communications device, a reference signal to the second wireless communications device. The method further includes receiving, by the first wireless communications device, a transmission parameter based on the reference signal, the resource allocation mode, and the traffic parameter indication, from the second wireless communications device.

In an additional aspect of the disclosure, a wireless communications device includes a processor and a transceiver. The transceiver is configured to receive a resource allocation mode indication from a second wireless communications device. The transceiver is further configured to receive a traffic parameter indication from the second wireless communication device. The transceiver is further configured to transmit a transmission parameter to the second wireless communications device as part of a channel state feedback message. The processor is configured to select the transmission parameter based on a reference signal, the resource allocation mode indication, and the traffic parameter indication.

In an additional aspect of the disclosure, a wireless communications device includes a processor and a transceiver. The transceiver is configured to transmit a resource allocation mode indication to a second wireless communications device. The transceiver is further configured to transmit a traffic parameter indication to the second wireless communications device. The transceiver is further configured to transmit a reference signal to the second wireless communications device. The transceiver is further configured to receive a transmission parameter based on the reference signal, the resource allocation mode, and the traffic parameter indication, from the second wireless communications device.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
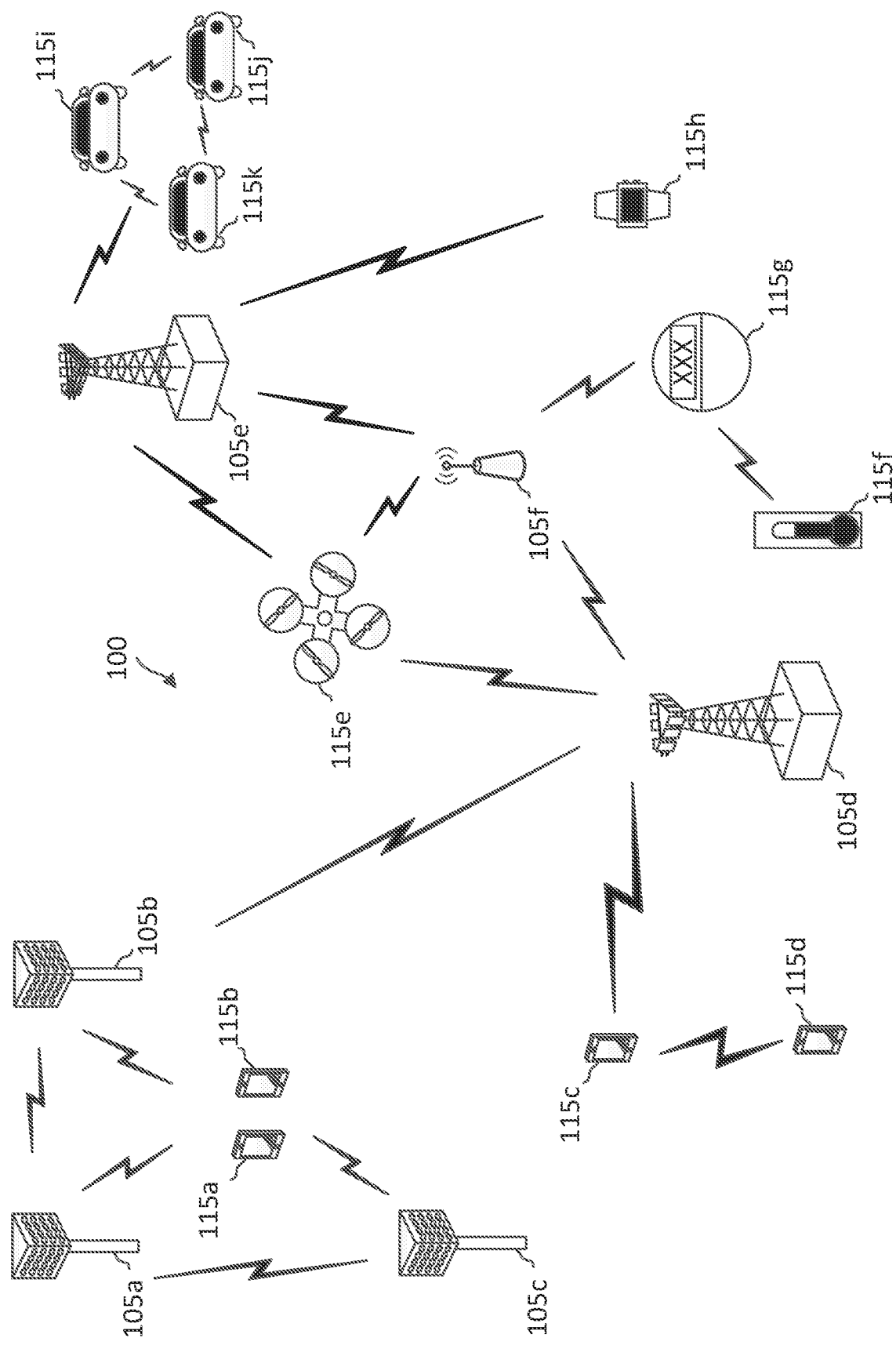
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present disclosure describes methods (and associated devices and systems) for wireless communications devices to dynamically select transmission parameters that satisfy various objectives under a set of constraints that have been conveyed to them from another wireless communications device.

For example, according to embodiments of the present disclosure, a wireless communications device (e.g., a UE) may receive a resource allocation mode indication and a traffic parameter indication from a second wireless communications device (e.g., a BS). The resource allocation mode indication and the traffic parameter indication may be received simultaneously, or in different transmissions. The resource allocation mode indication may inform the UE what a desired objective may be for selecting transmission parameters, e.g. whether to optimize along a time dimension, a frequency dimension, and/or a spatial domain. The traffic parameter indication may inform the UE what constraints to consider when selecting the transmission parameters in alignment with what was identified from the resource allocation mode allocation. Examples of traffic parameters may include a reliability target (e.g., a block error rate (BLER)), a payload size target (e.g., keeping the payload size at or above a target), and/or a delivery deadline (e.g., a target time in which data is delivered). The UE may then use this information upon receipt of a reference signal. For example, the UE may select one or more transmission parameters that satisfy the objectives of the indicated resource allocation mode under the indicated constraint(s) based on the received reference signal, resource allocation mode indication, and traffic parameter indication. As a result, the UE may select transmission parameters that optimize along one or more dimensions while meeting the desired traffic parameter indication target(s).

In some circumstances, if the UE may be unable to meet an indicated traffic parameter target within a designated time frame (e.g., a single slot) according to the indicated resource allocation mode, the UE may fall back or transition to a different mode. For example, by default the UE may fall back to a maximum-payload mode (e.g., as further described with respect to FIG. 3 below). Alternately, instead of falling back to the maximum-payload mode, the UE may transition to a multi-slot mode where it considers more than a single slot when selecting transmission parameters that satisfy a desired objective that takes into account a delivery deadline (even if across multiple slots). Once the UE selects transmission parameters, it may transmit them to the BS, for example, in a CSF report. The BS may then transmit a message to the UE using the UE's recommended transmission parameters, or it may disregard the recommended transmission parameters and transmit the message using a different set of parameters determined by the BS.

Aspects of the present disclosure provide several benefits. For example, embodiments of the present disclosure enable a UE to provide channel state feedback that is more tailored to the actually desired/useful targets for given traffic between wireless communications devices. Embodiments of the present disclosure also eliminate the need to engage in multiple requests and responses for transmission parameters for different traffic parameters (e.g., specifying different ranks each time) that the current approach suffers from, instead allowing the transmission parameters to be determined dynamically (e.g., trying different ranks for a certain TB size). Embodiments of the present disclosure may also increase efficiency and reduce interference when optimizing resource block allocation and spatial domain use. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a 1-DD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. The random access procedure may alternatively be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some embodiments, a BS 105 intending to transmit a message to a UE 115 may instruct the UE 115 to focus on optimizing one or more domains (e.g., time, frequency, and/or spatial) when determining a recommended set of transmission parameters (e.g., that the UE 115 will send in a message to the BS 105). For example, the BS 105 may transmit to the UE 115 a resource allocation mode indication informing the UE 115 of what its objective should be when selecting transmission parameters, and a traffic parameter indication specifying constraints or targets to use when determining the recommended set of transmission parameters. The BS 105 may transmit the indications to the UE 115 as part of control messaging in some examples, such as a downlink control information (DCI) message on the PDCCH, or as part of a radio resource control (RRC) message, or through any combination of DCI and RRC messages. For example, the resource allocation mode indication and the traffic parameter indication may both be transmitted as part of a DCI message, or the resource allocation mode indication may be transmitted as part of an RRC message while the traffic parameter indication may be transmitted as part of a DCI message.

Figure 3:
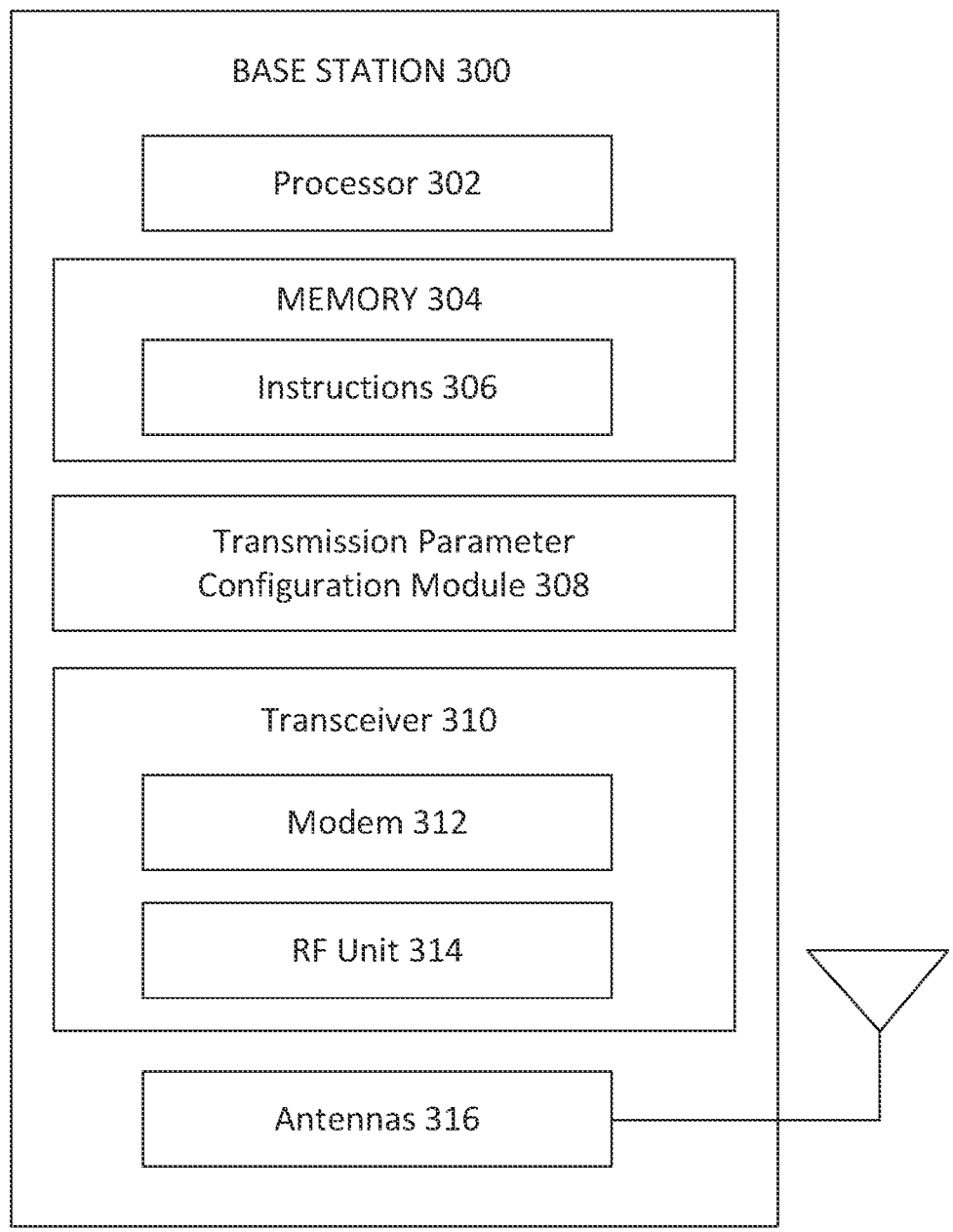
FIG. 3 is a block diagram of an exemplary base station (BS) according to embodiments of the present disclosure.

As described in detail in the discussion of FIG. 3, examples of the resource allocation mode may include a maximum-payload mode, where the objective is to maximize the payload size within a given time frame (e.g., within a slot). Another example includes a minimum-resource block mode, where the objective is to minimize the number of resource blocks selected for transmission (e.g., within a slot). Another example includes a minimum-carrier mode, where the objective is to minimize the number of component carriers activated for transmission (e.g., within a slot). Another example includes a minimum-rank mode where the objective is the minimize the rank (i.e., number of spatial layers) used (e.g., within a slot). Another example includes a maximum-modulation and coding scheme (MCS) mode, where the objective is to maximize the MCS (e.g., within a slot). Another example includes a maximum-spectral efficiency mode, where the objective is to maximize the spectral efficiency, i.e., the product of rank and MCS, or the number of bits per resource element (e.g., within a slot). Yet another example includes a maximum-reliability mode, where the objective is to maximize the reliability of the transmission (e.g., within a slot), which may include, for example, minimizing the BLER.

The BS 105 may also indicate an alternate mode of operation if the UE 115 is unable to meet a payload size target within a single time frame or slot using the resource allocation mode indicated by the BS 105. The BS 105 may include the alternate mode as part of the resource allocation mode indication or as an additional indication to the UE 115. Alternately, the BS 105 may indicate the alternate mode of operation only (i.e., without indicating one of the resource allocation mode examples noted above and discussed further below with respect to FIG. 3 and other figures). As yet another alternative, the UE may determine the alternate mode without explicit instruction from the BS 105 (e.g., based on a default configuration option). The alternate mode may include a fallback mode, where the UE 115 reverts to a maximum-payload mode (e.g., by default). The alternate mode may alternatively be one of several multi-slot planning modes, where the UE 115 recommends parameters based on satisfying an objective (indicated by the BS 105, such as via the DCI or RRC) over multiple slots. The multi-slot planning modes may include a minimum-payload error rate mode, where the objective is to minimize the probability of the payload not being delivered successfully within a deadline (e.g., identified by the traffic parameter indication from the BS 105). Another example multi-slot planning mode includes a minimum-transport block (TB) mode, where the objective is to minimize the number of transport blocks used during transmission of the message. Yet another example includes a minimum-delay mode, where the objective is to minimize the number of slots used for transmitting the message.

The BS 105 may transmit to the UE 115 a reference signal, such as a CSI-RS, and the UE 115 may perform channel estimation using the reference signal. The UE 115 may select (e.g., including computing, selecting, or otherwise determining) recommended transmission parameters to feedback to the BS 105 based on the reference signal (i.e., on the results of channel estimation), the resource allocation mode indication, and the traffic parameter indication transmitted by the BS 105. These transmission parameters may satisfy the objective(s) corresponding to the resource allocation mode and the constraints imposed by the traffic parameter(s). This may further take into account a set of frequency domain resources (e.g., resource blocks) that the BS 105 indicated the UE 115 may choose when recommending resources to should use for transmitting a DL message. The set of frequency domain resources may also be indicated in a DCI or an RRC message, and may be the same resources the reference signal is transmitted on.

The UE 115 may transmit the recommended transmission parameter(s) and/or the recommended set of frequency domain resources to the BS 105 as part of, for example, a CSF report on the PUSCH or PUCCH. In response, the BS 105 may adopt the recommended transmission parameters and transmit a message to the UE 115 based on those recommended transmission parameters. Alternately, the BS 105 may disregard the recommended transmission parameters and transmit the message to the UE 115 using a different set of parameters determined by the BS 105. Accordingly, embodiments of the present disclosure provide a more flexible and responsive solution that allows the UEs to maximize one or more parameters based on the unique characteristics of a given payload that a BS intends to transmit to a UE within a given time frame.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2:
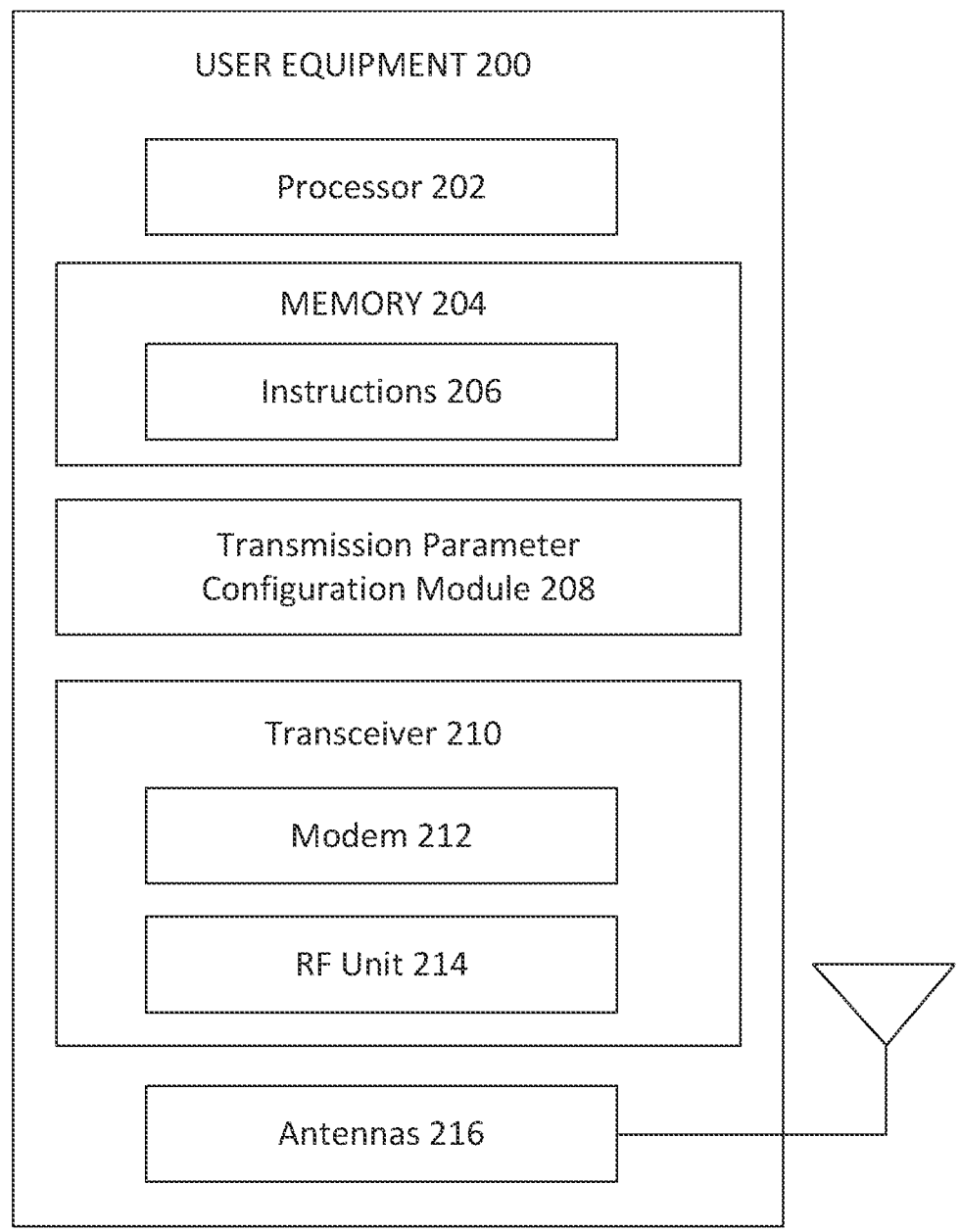
FIG. 2 is a block diagram of an exemplary user equipment (UE) according to some embodiments of the present disclosure.

FIG. 2 is a block diagram of an exemplary UE 200 according to embodiments of the present disclosure. The UE 200 may be a UE 115 discussed in FIG. 1. As shown, the UE 200 may include a processor 202, a memory 204, a transmission parameter configuration module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store, or have recorded thereon, instructions 206. The instructions 206 may include instructions that, when executed by the processor 202, cause the processor 202 to perform the operations described herein with reference to the UEs 115 in connection with embodiments of the present disclosure. Instructions 206 may also be referred to as program code. The program code may be for causing a wireless communication device (or specific component(s) of the wireless communication device) to perform these operations, for example by causing one or more processors (such as processor 202) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The transmission parameter configuration module 208 may be implemented via hardware, software, or combinations thereof. For example, transmission parameter configuration module 208 may be implemented as a processor, circuit, and/or instructions 206 stored in the memory 204 and executed by the processor 202. In some examples, the transmission parameter configuration module 208 can be implemented by a combination of software components (e.g., executed by a DSP or a general processor) and hardware components (e.g., logic gates and circuitry) as a standalone subsystem or within another subsystem of the UE 200.

The transmission parameter configuration module 208 may be used for various aspects of the present disclosure to determine a set of recommended transmission parameters for a wireless communication device, e.g., a BS 105, to transmit a message to the UE 200. The transmission parameter determination may be based on a resource allocation mode indication, a traffic parameter indication, and one or more reference signals received from the BS 105. The resource allocation mode indication may indicate the objective (i.e., a resource allocation mode with a specified objective that the UE 200 may seek to achieve) for the transmission parameter configuration module 208 to meet when selecting transmission parameters and the traffic parameter indication(s) may indicate the constraints the transmission parameter configuration module 208 may consider when selecting the transmission parameters to optimize according to the indicated resource allocation mode.

In some examples, the resource allocation mode indication may be an explicit signaling of the mode that the BS 105 would like the UE 200 to optimize for. In such an example, the full information of the mode may be sent to the UE 200 every time an alternative from a default mode (e.g., maximum-payload mode) is sought. In other examples, the resource allocation mode indication may be an implicit signaling. In such other examples, the UE 200 may use the implicit signaling (e.g., a few bits) that the UE 200 uses to index into memory (e.g., look up locally in memory 204) to identify a resource allocation mode from several stored within the memory 204. Thus, the different possible resource allocation modes (including alternative modes mentioned above and further below) may be pre-stored in the UE 200, either at a time of initial configuration or upon receipt of updated configuration information from one or more network elements.

Examples of the resource allocation mode (which may be indicated by the resource allocation mode indication) may include a maximum-payload mode, a minimum-resource block mode, a minimum-carrier mode, a minimum-rank mode, a maximum-MCS mode, a maximum-spectral efficiency mode, and a maximum-reliability mode (each of which is described in more detail in the discussion of FIG. 3 below). These resource allocation modes may correspond to a particular time frame, such as a single slot or frame. Other resource allocation modes, referred to as alternate modes, may also (or alternatively) be indicated from the BS 105 as discussed further above and below (e.g., when the target for optimization cannot be met within the time frame subject to the constraint(s) of the traffic parameter indication). The traffic parameter(s) (which may be indicated by the traffic parameter indication) may include constraints or targets to be met by the transmission configuration module 208 of the UE 200 when determining the transmission parameters to be included in a report to the BS 105 (e.g., a CSF report), such as taking the form of values for specific characteristics of the transmission to be below, equal to, or above. The traffic parameters may include, for example, a reliability target (e.g., a BLER target), a payload size target, a delivery deadline target, and a payload error rate target, as described in detail in the discussion of FIG. 3 below. The transmission parameter configuration module 208 may rely on the results of channel estimation performed by components of the UE 200—for example, by the transceiver 210, the memory 204, and the processor 202—when determining the transmission parameters to be fed back to the BS 105.

For example, the UE 200 may receive a resource allocation mode indication and a traffic parameter indication from the BS 105, such as in a DCI in a control channel of a slot or frame, or in an RRC message, or in any combination of DCI and RRC messages. For example, the resource allocation mode indication and the traffic parameter indication may both be transmitted as part of a DCI message, or the resource allocation mode indication may be transmitted as part of an RRC message while the traffic parameter indication may be transmitted as part of a DCI message. The UE 200 may also receive a set of frequency domain resources (e.g., resource blocks, either signaled explicitly in the control message or implicitly via the resources used for the control message transmission) from which the UE 200 may select in recommending what resources to transmit the message on. When the UE 200 receives one or more reference signals from the BS 105, the UE 200 may perform channel estimation to determine the channel state based on the reference signal(s). Based on that information and the resource mode allocation and traffic parameter indications, the transmission parameter configuration module 208 may determine a set of transmission parameters that satisfy the objective associated with the resource allocation mode, within the constraints indicated by the traffic parameter(s), considering the channel state determined using the reference signal(s).

In some situations, the transmission parameter configuration module 208 may determine to use an alternate mode when selecting transmission parameters to feedback to the BS 105, for example based upon a condition being satisfied or not satisfied. For example, if a traffic parameter indication includes a target (e.g., a payload size target) that cannot be met within a single time frame or slot, the traffic parameter configuration module 208 may fall back to a maximum-payload mode (e.g., as described in more detail in the discussion of FIG. 3). Alternately, the traffic parameter configuration module 208 may transition to one of various possible multi-slot alternate modes applied over multiple slots. Examples of the multi-slot alternate modes may include a minimum-payload error rate mode, a minimum-transport block mode, and a minimum-delay mode. The alternate mode may be specified by the BS 105 as part of, or in addition to, the resource mode indication (i.e., when trying to accomplish a transmission within one time frame such as a slot), or it may be determined by the traffic parameter configuration module 208 and identified in the signaling back to the BS 105.

Once the transmission configuration module 208 has determined a recommended set of transmission parameters (e.g., included within a CSF report), it may cause the UE 200 to transmit the recommended transmission parameters to the BS 105 using, for example, the transceiver 210 and antennas 216.

As shown, the transceiver 210 may include the modem subsystem 212 and the RF unit 214. The transceiver 210 can be configured to communicate bi-directionally with other devices, such as the BSs 105. The modem subsystem 212 may be configured to modulate and/or encode the data from the memory 204, and/or the transmission parameter configuration module 208 according to a modulation and coding scheme (MCS) (e.g., a low-density parity check (LDPC) coding scheme, a turbo coding scheme, a convolutional coding scheme, a digital beamforming scheme, etc.). The RF unit 214 may be configured to process (e.g., perform analog to digital conversion or digital to analog conversion, etc.) modulated/encoded data (e.g., UL data bursts, interference indications, RRC messages, RACH message(s), ACK/NACKs for DL data bursts, scheduling data) from the modem subsystem 212 (on outbound transmissions) or of transmissions originating from another source such as a UE 115 or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 200 to enable the UE 200 to communicate with other devices.

The RF unit 214 may provide the modulated and/or processed data (e.g., data packets or, more generally, data messages that may contain one or more data packets and other information) to the antennas 216 for transmission to one or more other devices. The antennas 216 may further receive data messages transmitted from other devices. The antennas 216 may provide the received data messages for processing and/or demodulation at the transceiver 210. The transceiver 210 may provide the demodulated and decoded data (e.g., DL/UL scheduling grants, requests for reports such as CQIs, DL data bursts, RRC messages) to different elements/modules of the UE 200, including for example providing a resource allocation mode indication and a traffic parameter indication (such as from a DCI received and decoded, or an RRC message) to the transmission parameter configuration module 208 for processing. The antennas 216 may include multiple antennas of similar or different designs in order to sustain multiple transmission links. The RF unit 214 may configure the antennas 216.

In an embodiment, the UE 200 can include multiple transceivers 210 implementing different RATs (e.g., NR and LTE). In an embodiment, the UE 200 can include a single transceiver 210 implementing multiple RATs (e.g., NR and LTE). In an embodiment, the transceiver 210 can include various components, where different combinations of components can implement different RATs.

FIG. 3 is a block diagram of an exemplary BS 300 according to embodiments of the present disclosure. The BS 300 may be a BS 105 as discussed above in FIG. 1. As shown, the BS 300 may include a processor 302, a memory 304, transmission parameter configuration module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. Instructions 306 may also be referred to as code, which may be interpreted broadly to include any type of computer-readable statement(s) as discussed above with respect to FIG. 2.

The transmission parameter configuration module 308 may be implemented via hardware, software, or combinations thereof. For example, the transmission parameter configuration module 308 may be implemented as a processor, circuit, and/or instructions 306 stored in the memory 304 and executed by the processor 302. In some examples, the transmission parameter configuration module 308 can be implemented by a combination of software components (e.g., executed by a DSP or a general processor) and hardware components (e.g., logic gates and circuitry) as a standalone subsystem or within another subsystem of the BS 300.

The transmission parameter configuration module 308 may be used for various aspects of the present disclosure to aid the BS 300 in transmitting a message by instructing a recipient UE (115 or 200, for example) on what resource allocation mode to optimize for, subject to indicated constraint(s) in recommending transmission parameters to the BS 300 for the message transmission. The transmission parameter configuration module 308 may request from a UE 200 to optimize for a given resource allocation mode when the UE 200 undertakes to determine a set of recommended transmission parameters that the UE 200 feeds back to the BS 300. Prior to sending one or more reference signals (such as CSI-RS) to the UE 200, the transmission parameter configuration module 308 may determine a desired resource allocation mode and one or more traffic parameters for the UE 200 to use/optimize for when determining recommended transmission parameters to include in a feedback report.

The resource allocation mode may specify the objective that the transmission parameter configuration module 308 is asking the UE 115 to meet when selecting transmission parameters provided in feedback. The traffic parameter(s) identified by the traffic parameter indication may specify the one or more constraints for the UE 115 to meet when selecting the transmission parameters (and while optimizing according to the specified resource allocation mode). The resource allocation mode may include, for example, a maximum-payload mode, a minimum-resource block mode, a minimum-carrier mode, a minimum-rank mode, a maximum-MCS mode, a maximum-spectral efficiency mode, and maximum-reliability mode as described below. Other alternative modes may also or alternatively be indicated. The traffic parameter(s) may include constraints or targets to be met by the UE 115 when determining the transmission parameters for feedback, such as taking the form of values for specific characteristics of the transmission to be below, equal to, or above. The traffic parameters may include, for example, a reliability target (e.g., BLER), a payload size target, a delivery deadline target, and/or a payload error rate target as described below.

The transmission parameter configuration module 308 may specify the resource allocation mode and traffic parameters in indications transmitted to the UE 200 by, for example, the transceiver 310 and antennas 316. For example, the transmission parameter configuration module 308 may include the indications as part of a DCI message of a slot or frame, or as part of an RRC message, or through a combination of DCI and RRC messages to the UE 200. For example, the resource allocation mode indication and the traffic parameter indication may both be transmitted as part of a DCI message, or the resource allocation mode indication may be transmitted as part of an RRC message while the traffic parameter indication may be transmitted as part of a DCI message. In addition, the transmission parameter configuration module 308 may also indicate to the UE 200 a set of frequency domain resources (e.g., resource blocks) from which the UE 200 may select when recommending resources for transmitting the message.

The transmission parameter configuration module 308 may select from various resource allocation modes to satisfy objectives based on, for example, characteristics of the message to be transmitted or the devices involved, and/or network conditions. The resource allocation mode may relate to a single time frame or slot, or may relate to multiple time frames or slots when operating under a multi-slot planning mode as described below (e.g., where a delivery deadline target extends beyond the current time frame (such as a slot)).

One example resource allocation mode that the transmission parameter configuration module 308 may select is a maximum-payload resource allocation mode. The maximum-payload resource allocation mode may direct the UE 200 to select recommended transmission parameters that will maximize the payload size within the time frame (e.g., within a slot). Transmission parameters that may be affected by this optimization choice may include a rank (i.e., number of spatial dimensions) and modulation and coding scheme (MCS) that would maximize the payload size within the time frame. The transmission parameter configuration module 308 may specify a reliability target as a traffic parameter (i.e., which is signaled to the UE 200 via the traffic parameter indication). The traffic parameter indication may impose a constraint on the transmission parameters. In this example, that constraint may be a reliability target that any transmission parameters selected while maximizing the payload size may keep the BLER at or under a target (e.g., 0.1 or 0.0001). Accordingly, the maximum-payload mode may optimize transmitting as much of a message from the BS 300 as is feasible in a single time frame (e.g., a slot).

Another example of a resource allocation mode that the transmission parameter configuration module 308 may select is a minimum-RB resource allocation mode. Indicating the minimum-RB allocation mode to the UE 200 may direct the UE 200 to select recommended transmission parameters that will minimize the number of resource blocks selected for transmitting the message within the time frame (e.g., a slot). Transmission parameters that may be affected by this optimization choice may include a set of RBs, a rank, and/or an MCS. The transmission parameter configuration module 308 may specify a reliability target and a payload size target as traffic parameters (i.e., which are signaled to the UE 200 via traffic parameter indication). The traffic parameter indication may impose a constraint on the transmission parameters—here, to values that keep the BLER to the specified reliability target and the payload size to the payload size target. The minimum-RB mode increases the number of RBs available for use by other devices, even if that includes increasing the rank used to transmit the current message. Thus, enough resource blocks are selected to accommodate the packet size with the chosen MCS.

Another example of a resource allocation mode that the transmission parameter configuration module 308 may select is a minimum-carrier resource allocation mode. Indicating the minimum-carrier allocation mode to the UE 200 may direct the UE 200 to select recommended transmission parameters that will minimize the number of component carriers (CCs) activated for transmitting the message within the time frame (e.g., a slot). Transmission parameters that may be affected by this optimization choice may include a set of component carriers, a rank, and/or an MCS. The transmission parameter configuration module 308 may specify a reliability target and a payload size target as traffic parameters (i.e., which are signaled to the UE 200 via traffic parameter indication). The traffic parameter indication may impose a constraint on the transmission parameters—here, to values that keep the BLER to the specified reliability target and the payload size to the payload size target. The minimum-carrier mode increases the number of CCs available for use by other devices, even if that includes increasing the rank used to transmit the current message.

Another example of a resource allocation mode that the transmission parameter configuration module 308 may select is a minimum-rank resource allocation mode. Indicating the minimum-rank resource allocation mode to the UE 200 may direct the UE 200 to select recommended transmission parameters that will minimize the number of spatial layers used for transmitting the message within the time frame (e.g., a slot). Transmission parameters that may be affected by this optimization choice may include a rank, and/or an MCS. The transmission parameter configuration module 308 may specify a reliability target and a payload size target as traffic parameters (i.e., which are signaled to the UE 200 via traffic parameter indication). The traffic parameter indication may impose a constraint on the transmission parameters, here to values that keep the BLER to the specified reliability target and the payload size to the payload size target. The minimum-rank mode may increase the availability of resources available in the spatial domain for use by other devices, because it may select the lowest possible rank to hold the payload size by potentially using as many resource blocks as are necessary within the time frame.

Yet another example of a resource allocation mode that the transmission parameter configuration module 308 may select is a maximum-MCS resource allocation mode. Indicating the maximum-MCS resource allocation mode to the UE 200 may direct the UE 200 to select recommended transmission parameters that will maximize the MCS used for transmitting the message within the time frame (e.g., slot). Transmission parameters that may be affected by this optimization choice may include a set of resource blocks and/or a rank. The transmission parameter configuration module 308 may specify a reliability target and a payload size target as traffic parameters (i.e., which are signaled to the UE 200 via traffic parameter indication). The traffic parameter indication may impose a constraint on the transmission parameters, here to values that keep the BLER to the specified reliability target and the payload size to the payload target size. As a result, the UE 200 may optimize on the resource blocks selected for the recommended transmission parameters.

Another example of a resource allocation mode that the transmission parameter configuration module 308 may select is a maximum-spectral efficiency resource allocation mode. Indicating the maximum-spectral efficiency resource allocation mode to the UE 200 may direct the UE 200 to select recommended transmission parameters that will maximize the combination or product of rank and modulation and coding rate (i.e., the number of bits transmitted per resource element) during message transmission within the time frame (e.g., slot). Transmission parameters that may be affected by this optimization choice may include a set of resource blocks and/or a rank. The transmission parameter configuration module 308 may specify a reliability target and a payload size target as traffic parameters (i.e., which are signaled to the UE 200 via traffic parameter indication). The traffic parameter indication may impose a constraint on the transmission parameters, here to values that keep the BLER to the specified reliability target and the payload size to the specified payload target size.

As another example, the transmission parameter configuration module 308 may select a maximum-reliability resource allocation mode. Indicating the maximum-reliability resource allocation mode to the UE 200 may direct the UE 200 to select recommended transmission parameters that will maximize the reliability of message transmission within the time frame (e.g., slot), for example, by minimizing the BLER. Transmission parameters that may be affected by this optimization choice may include a set of resource blocks, a rank, and/or an MCS. The transmission parameter configuration module 308 may specify a payload size target as a traffic parameter (i.e., which is signaled to the UE 200 via traffic parameter indication). The traffic parameter indication may impose a constraint on the transmission parameters, here to values that keep the payload size to the specified payload target size. For example, optimizing based on the maximum-reliability resource allocation mode may result in the UE 200 selecting as low of an MCS as possible to fit the message within the given time frame (e.g., slot). The maximum-reliability mode may be useful when the number of slots available before a deadline is limited (such as at the end of a slot with no retransmit opportunities), as it increases the probability of successful transmission of the message (from BS 300 to UE 200 based on the recommended transmission parameters fed back to the BS 300) within a short time frame.

As noted above, situations may arise where the UE 200 is unable to meet the optimization target (e.g., identified by the resource allocation mode indication) within the specified constraint(s) (e.g., identified by the traffic parameter indication). To address such situations, the transmission parameter configuration module 308 of the BS 300 may also (or alternatively) indicate an alternate resource allocation mode, for example if transmission that optimizes the particular dimension (per the mode) subject to one or more constraints (traffic parameters) within a time frame (e.g., a slot). In some examples, the BS 300 may signal the alternate resource allocation mode to the UE 200, while in other examples a UE 200 may independently determine an alternate resource allocation mode (e.g., based on one or more alternate resource allocation modes signaled previously to the UE 200 or otherwise preconfigured). As a result, if a payload size target cannot be met using a particular resource allocation mode and corresponding traffic parameters within the time frame, transmission parameters may be determined using an alternate mode—either as specified by the transmission parameter configuration module 308 (e.g., as part of the DCI message or the RRC message), or as determined by the UE 115.

The alternate resource allocation mode may be a fallback mode. For example, the transmission configuration module 308 may indicate that if a payload target cannot be met under the indicated resource allocation mode (i.e., a payload size cannot be transmitted within a time frame while optimizing for the particular dimension per the indicated resource allocation mode), the UE 200 may fall back to the maximum-payload mode described above. This may be a default option for the UE 200. The transmission parameters fed back from the UE 200 to the transmission parameter configuration module 308 may, in that case, be based on the maximum-payload mode described above rather than the mode initially indicated by the transmission parameter configuration module 308.

As an alternative to the fallback mode, the transmission configuration module 308 may indicate one of a number of multi-slot planning modes as an alternate mode. While discussed as being an alternate mode that the UE 200 is directed to select only if a primary, single-timeframe (e.g. a slot) mode cannot be met within one or more specified constraints, in some embodiments the multi-slot mode may be the primary choice that the transmission configuration module 308 signals to the UE 200 via the resource allocation mode indication. The modes discussed below are equally applicable in either scenario. In a multi-slot planning mode, the transmission parameters may be determined in order to meet the objective corresponding to the mode over a number of time periods rather than during a single time frame (such as over several slots, instead of just one slot).

One exemplary multi-slot mode that the transmission configuration module 308 may select to signal to the UE 200 is a minimum-payload error rate mode. The minimum-payload error rate mode may direct the UE 200 to select recommended transmission parameters that will minimize the payload error rate across the time periods. The payload error rate may be, for example, the probability that the payload will not be delivered by a delivery deadline, where the delivery deadline may itself be a target specified with a traffic parameter indication by the transmission configuration module 308. The transmission parameters that may be affected by this optimization choice may include a set of RBs, a rank, and/or an MCS. The traffic parameter indication may impose a constraint on the transmission parameters, here to values that keep a payload size to a specified payload size, and delivery completion of the message to a specified delivery deadline target. As a result, the error rate may be over the entire payload, not just to one slot containing a part of the payload.

Another exemplary multi-slot mode that the transmission configuration module 308 may select to signal to the UE 200 is a minimum-transport block mode. The minimum-transport block mode may direct the UE 200 to select recommended transmission parameters that will minimize the number of transport blocks used to send the message across the time periods. The transmission parameters that may be affected by this optimization choice may include a set of RBs, a rank, and/or an MCS. The traffic parameter indication may impose a constraint on the transmission parameters, here to values that keep a payload size to a specified payload size, and the BLER to a specified reliability target. As a result, the UE 200 may recommend transmission parameters that minimize a number of slots subject to the BLER target, in order to conserve power. In some examples, the UE 200 implementing this mode might not account for how often retransmission may need to occur.

Yet another exemplary multi-slot mode that the transmission configuration module 308 may select to signal to the UE 200 is a minimum-delay mode. The minimum-delay mode may direct the UE 200 to select recommended transmission parameters that will minimize the number of slots used to send the message, accounting for the probability of retransmissions following failed transmissions. The transmission parameters that may be affected by this optimization choice may include a set of RBs, a rank, and/or an MCS. The traffic parameter indication may impose a constraint on the transmission parameters, here to values that keep a payload size to a specified payload size, and payload error rate target to a specified probability of the payload not being delivered successfully. In some examples, this may be subject to a delivery deadline that the transmission configuration module 308 selects as well to be part of the traffic parameter indication to the UE 200.

After transmitting the resource allocation mode and traffic parameter indications, and further after the BS 300 transmits at least one reference signal, the BS 300 may receive, for example, through the antennas 316 and transceiver 310, a set of recommended transmission parameters from the UE 115 (such as part of a CSF report). The recommended transmission parameters may thus be based on the resource allocation mode, the traffic parameter(s), and/or the resource blocks that may be used. The transmission parameter configuration module 308 may elect to use the recommended parameters or may instead elect to determine a different set of transmission parameters despite the recommendation from the UE 115 (or, more generally, the processor 302 may elect). Based on the transmission parameters elected, the BS 300 may transmit the message to the UE 115.

As shown, the transceiver 310 may include the modem subsystem 312 and the RF unit 314. The transceiver 310 can be configured to communicate bi-directionally with other devices, such as the UEs 200 and/or another core network element. The modem subsystem 312 may be configured to modulate and/or encode data according to a MCS (e.g., a LDPC coding scheme, a turbo coding scheme, a convolutional coding scheme, a digital beamforming scheme, etc.). For example, the data may include, according to embodiments of the present disclosure, resource allocation mode indications, traffic parameter indications, and so forth. Further, reference signals may be modulated/encoded for transmission to the UE 200 (and that the UE 200 may utilize to determine transmission parameters according to embodiments of the present disclosure). The RF unit 314 may be configured to process (e.g., perform analog to digital conversion or digital to analog conversion, etc.) modulated/encoded data (e.g., requests for interference reports, ACK/NACK requests, DL/UL scheduling grants, DL data, RRC messages, etc.) from the modem subsystem 312 (on outbound transmissions) or of transmissions originating from another source, such as a UE 115 or 200. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 300 to enable the BS 300 to communicate with other devices.

The RF unit 314 may provide the modulated and/or processed data, (e.g., data packets or, more generally, data messages that may contain one or more data packets and other information) to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The transceiver 310 may provide the demodulated and decoded data (e.g., interference change reports, CQI reports, UL data, ACK/NACKs for DL data, etc.) to elements of the BS 300 including the transmission parameter configuration module 308 for processing. The antennas 316 may include multiple antennas of similar or different designs in order to sustain multiple transmission links.

In an embodiment, the BS 300 can include multiple transceivers 310 implementing different RATs (e.g., NR and LTE). In an embodiment, the BS 300 can include a single transceiver 310 implementing multiple RATs (e.g., NR and LTE). In an embodiment, the transceiver 310 can include various components, where different combinations of components can implement different RATs.

Figure 4:
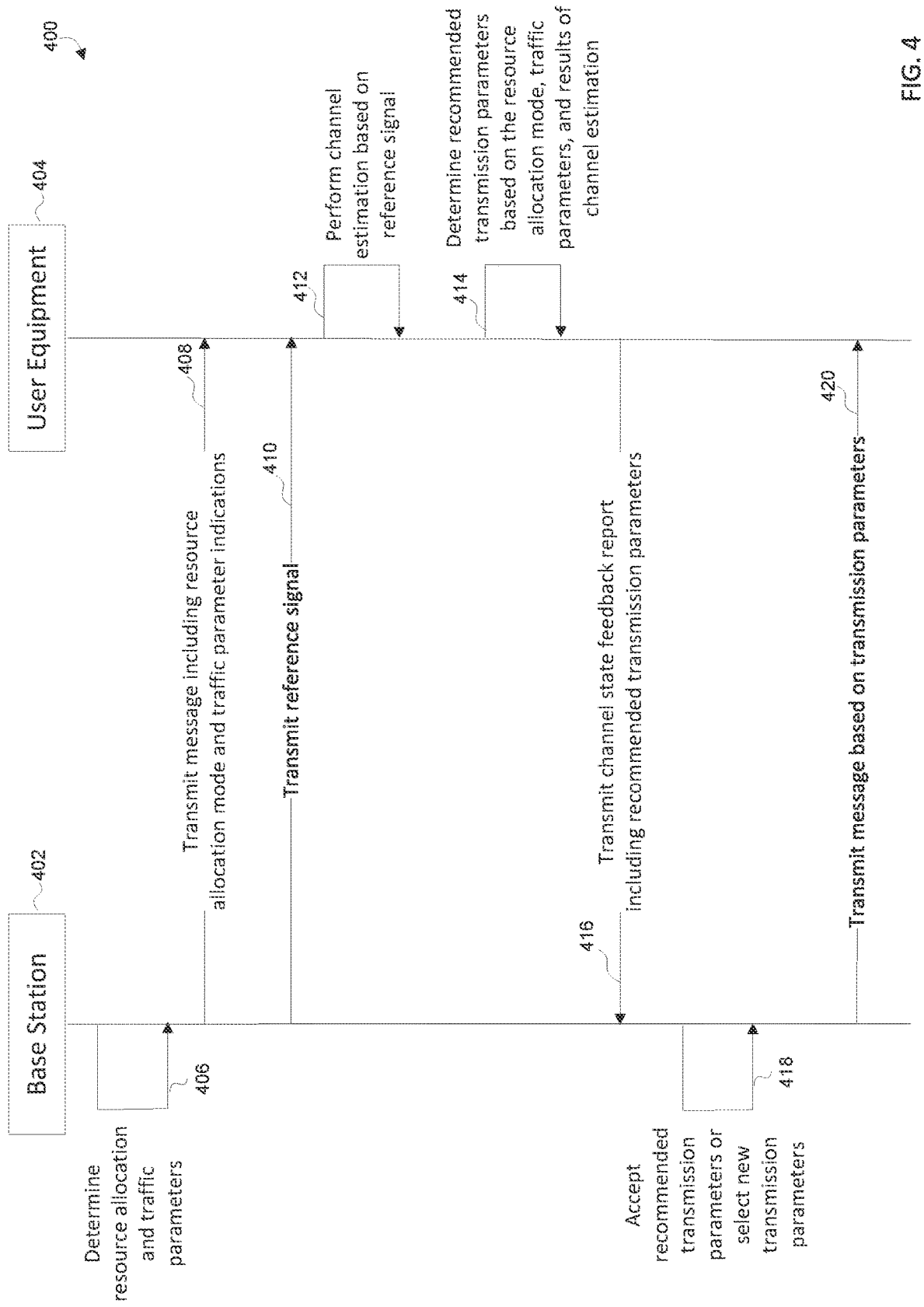
FIG. 4 is a protocol diagram according to some embodiments of the present disclosure.

FIG. 4 is a protocol diagram according to some embodiments of the present disclosure. The scheme 400 illustrates a possible communication sequence between a BS 402 (of which BSs 105 and 300 are examples) and a UE 404 (of which UEs 115 and 200 are examples), where the BS 402 provides a resource allocation mode that may account for one of multiple possible optimization dimensions such as time, frequency, and/or spatial domain, and one or more constraints to the UE 404, and where the UE 404 provides proposed transmission parameters for the BS to use in transmitting a message after determining properties of the channel.

At action 406, the BS determines a resource allocation mode that the BS 402 requests the UE 404 to use that identifies a dimension to optimize upon in determining transmission parameters at the UE 404 for potential use by the BS 402 in transmitting a message. The BS 402 also determines at action 406 one or more traffic parameters that may act as constraints upon the optimization at the UE 404 in determining recommended transmission parameters.

The BS 402 may select from various resource allocation modes to satisfy objectives based on, for example, characteristics of the message to be transmitted (e.g., a delivery deadline for the message, etc.) or the devices involved, and/or network conditions at the time of transmission. Possible allocation modes are described in detail in the discussion of FIG. 3 and may include a maximum-payload mode, where the objective is to maximize the payload size; a minimum-resource block mode, where the objective is to minimize the number of resource blocks selected for transmission; a minimum-carrier mode, where the objective is to minimize the number of component carriers activated for transmission (e.g., within a slot); a minimum-rank mode where the objective is the minimize the rank (i.e., number of spatial layers) used; a maximum-modulation and coding scheme (MCS) mode, where the objective is to maximize the MCS; a maximum-spectral efficiency mode, where the objective is to maximize the spectral efficiency, i.e., the number of bits per resource element; and a maximum-reliability mode, where the objective is to maximize the reliability of the transmission (e.g., by minimizing the BLER). The traffic parameters may include, for example, BLER or reliability, payload size, delivery deadline, and payload error rate targets as described in detail in the discussion of other figures above and below.

The BS 402 may also (or alternatively) indicate an alternate mode of operation if the UE 404 is unable to meet a payload size target using the resource allocation mode indicated by the BS 402 as part of the resource allocation mode indication within a single time frame (e.g., slot). The BS 404 may include the alternate mode as an additional indication to the UE 402, or as a primary indication (with no other mode indicated such as targeting a message in a single slot). The alternate mode may include a fallback mode, where the UE 402 reverts to, for example, a maximum-payload mode. The alternate mode may also be one of several multi-slot planning modes, where the UE 402 recommends parameters based on satisfying an objective over multiple slots. The multi-slot planning modes may include a minimum-payload error rate mode, where the objective is to minimize the probability of the payload not being delivered successfully within a deadline; a minimum-TB mode, where the objective is to minimize the number of transport blocks used during transmission of the message; and a minimum-delay mode, where the objective is to minimize the number of slots used for transmitting the message. The BS 402 may also determine a set of candidate resource blocks for transmission of the message, from which the UE 404 may choose when recommending transmission parameters.

At action 408, the BS 402 transmits resource allocation mode and traffic parameter indications to the UE 404. These may be explicitly or implicitly signaled, as noted above. The BS 402 may also transmit an indication specifying an alternate transmission mode. The indications may be transmitted as part of a part of a control signal, for example, a DCI message on the PDCCH or an RRC message, or a combination of DCI and RRC messages. For example, the resource allocation mode indication and the traffic parameter indication may both be transmitted as part of a DCI message, or the resource allocation mode indication may be transmitted as part of an RRC message while the traffic parameter indication may be transmitted as part of a DCI message. If transmitted in a DCI message, the indications may be added to an existing DCI format (e.g., a variation of format 1), or transmitted as part of a new DCI format. The control signal may include information about the candidate resource blocks from which the UE 404 may choose when recommending transmission parameters.

At action 410, the BS 402 transmits a reference signal to the UE 404. The reference signal may be a CSI-RS or other reference signal suitable for use in DL channel estimation.

At action 412, the UE 404 may perform channel estimation based on the reference signal of action 408 to determine the current state of the channel to be used by the BS 402 to transmit the message.

At action 414, the UE 404 may determine recommended transmission parameters—for example, rank, MCS, sets of resource blocks, and/or sets of component carriers—for use by the BS 402 when transmitting the message. Based on the reference signal (e.g., on the results of channel estimation), the resource allocation mode, and the traffic parameters, the UE 404 may select (which may include, for example, calculations or other types of determination) transmission parameters that satisfy the objective corresponding to the resource allocation mode and the constraints imposed by the traffic parameters.

If the UE 404 is unable to meet a payload size target using the resource allocation mode indicated by the BS 402, it may fall back to a maximum-payload mode. Alternately, the UE 404 may transition to one of several multi-slot planning modes—for example, minimum-payload error rate, minimum-transport block, and minimum-delay modes—where the UE 404 recommends parameters based on satisfying an objective over multiple slots. Whether to fall back or transition to a different mode, and which mode to fall back or transition to, may have been indicated by the BS 402, or determined by the UE 404.

At action 416, the UE 404 may transmit the recommended transmission parameters to the BS 402. The recommended transmission parameters may be included, for example, in a channel state feedback report on the PUSCH or PUCCH.

At action 418, the BS 402 may consider the transmission parameters recommended by the UE 404. The BS 402 may accept the recommended transmission parameters or reject them. If the BS 402 rejects the recommended transmission parameters, it may determine its own set of transmission parameters. The BS 402 may consider the information contained in a channel state feedback report or other information reported by the UE 404 at action 416 when determining a new set of transmission parameters.

At action 420, the BS 402 may transmit the message to the UE 404. The BS 402 may transmit the message using the transmission parameters recommended by the UE 404 at actions 414 and 416, or it may use a different set of transmission parameters determined by the BS at action 418.

Figure 5:
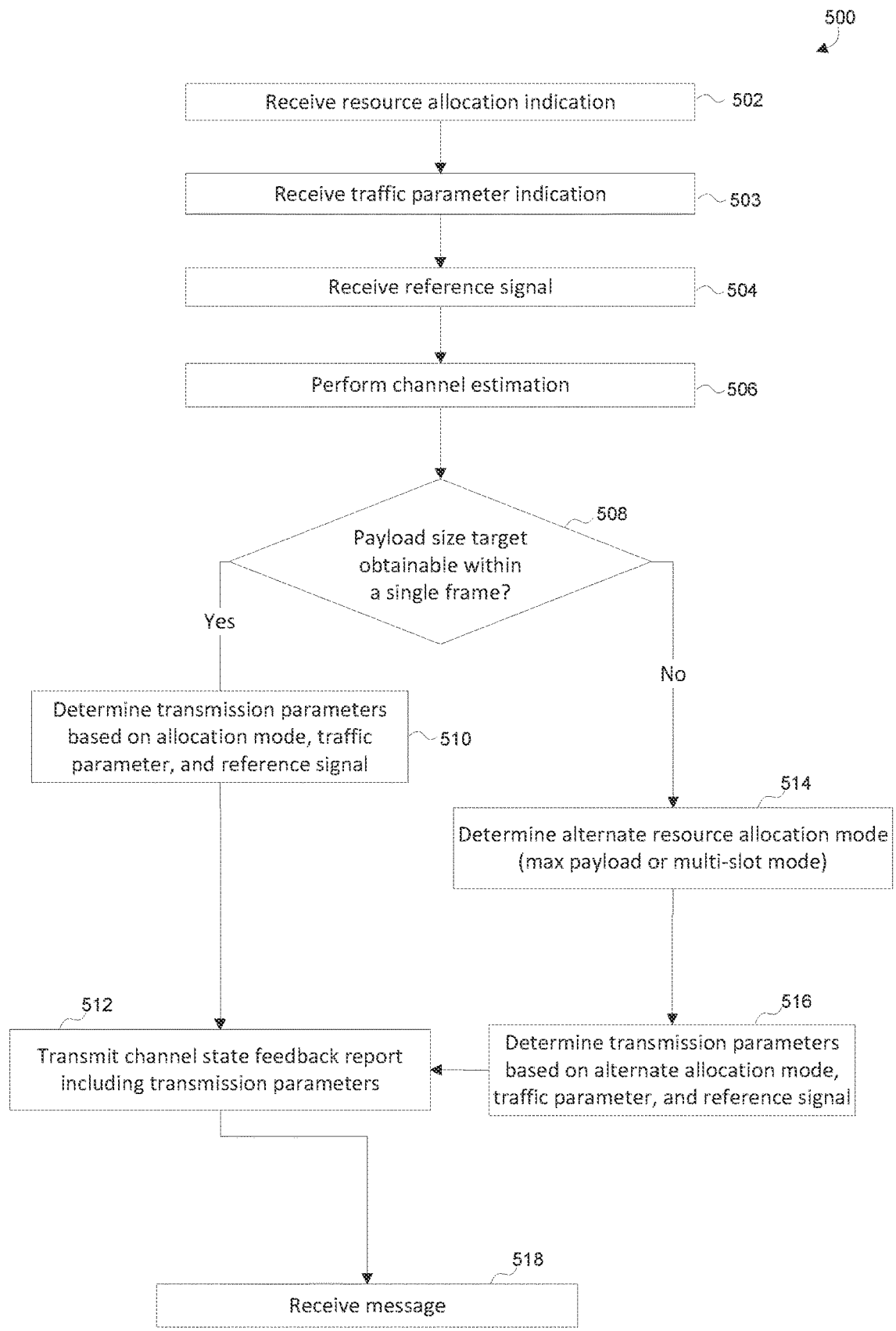
FIG. 5 is a flow diagram of a wireless communication method according to some embodiments of the present disclosure.

FIG. 5 is a flow diagram illustrating a wireless communication method 500 for determining transmission parameters for transmitting a message according to some embodiments of the present disclosure. Aspects of the method 500 can be executed by a wireless communication device, such as the UEs 115 and/or 200 utilizing one or more components, such as the processor 202, the memory 204, the transmission parameter configuration module 208, the transceiver 210, the modem 212, the one or more antennas 216, and various combinations thereof. As illustrated, the method 500 includes a number of enumerated steps, but embodiments of the method 500 may include additional steps before, during, after, and in between the enumerated steps. Further, in some embodiments, one or more of the enumerated steps may be omitted or performed in a different order.

At block 502, the UE 200 receives a resource allocation mode indication from, for example, a BS (e.g., 105 or 300). Possible allocation modes include a maximum-payload mode, where the objective is to maximize the payload size; a minimum-resource block mode, where the objective is to minimize the number of resource blocks selected for transmission; a minimum-carrier mode, where the objective is to minimize the number of component carriers activated for transmission (e.g., within a slot); a minimum-rank mode where the objective is the minimize the rank (i.e., number of spatial layers) used; a maximum-modulation and coding scheme (MCS) mode, where the objective is to maximize the MCS; a maximum-spectral efficiency mode, where the objective is to maximize the spectral efficiency, i.e., the number of bits per resource element; and a maximum-reliability mode, where the objective is to maximize the reliability of the transmission (e.g., by minimizing the BLER).

At block 503, the UE 200 receives a traffic parameter indication from, for example, a BS (e.g., 105 or 300). The traffic parameters may include reliability, payload size, delivery deadline, and payload error rate targets as described in detail above. In some aspects, the UE 200 may receive the resource allocation mode and traffic parameter indications simultaneously (e.g., blocks 502 and 503 may be combined). The UE 200 may also receive a set of candidate resource blocks from which it may choose when recommending transmission parameters.

The UE 200 may also receive an indication specifying an alternate mode for use if the UE 200 is unable to meet a payload size target using the indicated resource allocation mode within a single time frame (e.g., a slot), or as the primary mode if the BS 300 for example foregoes signaling a different, single-slot mode to begin with. The alternate mode may include a fallback mode, where the UE 200 falls back to, for example, a maximum-payload mode. The alternate mode may also be one of several multi-slot planning modes, where the UE 200 recommends parameters based on satisfying an objective over multiple slots. The multi-slot planning modes may include a minimum-payload error rate mode, where the objective is to minimize the probability of the payload not being delivered successfully within a deadline; a minimum-TB mode, where the objective is to minimize the number of TBs used during transmission of the message; and a minimum-delay mode, where the objective is to minimize the number of slots used for transmitting the message. The indications may be received as part of a part of a control signal, for example, a DCI message on the PDCCH or an RRC message, or a combination of the two. For example, the resource allocation mode indication and the traffic parameter indication may both be transmitted as part of a DCI message, or the resource allocation mode indication may be transmitted as part of an RRC message while the traffic parameter indication may be transmitted as part of a DCI message.

At block 504, the UE 200 receives one or more reference signals. The reference signal may be a CSI-RS or other reference signal suitable for use in DL channel estimation.

At block 506, the UE 200 performs channel estimation based on at least one of the one or more reference signals to determine the current state of the channel (at least the DL channel, if not also the UL channel if reciprocity exists) to be used for transmitting the DL message.

At decision block 508, the UE 200 evaluates whether it is able to provide transmission parameters within the constraints imposed by the traffic parameters received at block 502. It may be possible, for example, that the UE 200 was unable to meet the objectives of a given mode while meeting a payload size target within a single time frame (e.g., a slot). If the UE 200 is able to meet the mode's objectives while meeting a payload size target (if any), the method proceeds from decision block 508 to block 510.

At block 510, the UE 200 determines transmission parameters—for example, rank, MCS, sets of resource blocks, and/or sets of component carriers—to recommend for the BS 300 to use in transmitting the message, corresponding to the indicated resource allocation mode as described in detail above. Based on the reference signal (i.e., on the results of channel estimation), the resource allocation mode, and the traffic parameters, the UE 200 selects (which may include, for example, calculations or other types of determination) transmission parameters that satisfy the objective corresponding to the resource allocation mode and the constraints imposed by the traffic parameters.

At block 512, the UE 200 transmits the recommended transmission parameters as determined in blocks 510 or 516 (discussed further below). The recommended transmission parameters may be included, for example, in a channel state feedback report on the PUSCH or PUCCH.

Returning to decision block 508, if the UE 200 is unable to meet the mode's objectives while meeting a payload size target within a time frame (e.g., a slot), or where the BS 300 informed the UE 200 to focus on a multi-slot mode to begin with, the method 500 proceeds to block 514.

At block 514, the UE 200 determines an alternate resource allocation mode to fall back or transition to, or to otherwise use in determining transmission parameters. The alternate resource allocation mode may be determined by the UE 200, or it may be specified as part of the resource allocation mode indication, or a separate indication received (such as received at block 502). The alternate mode may be a fallback mode, where the UE 200 falls back to using, for example, a maximum-payload mode.

The alternate mode may alternatively be one of several multi-slot planning modes, where the UE 200 recommends transmission parameters based on satisfying an objective over multiple slots. The multi-slot planning modes include minimum-payload error rate, minimum-TB, and minimum-delay modes, as described in detail in discussion of FIG. 3.

At block 516, similar to the description of block 510, the UE 200 determines transmission parameters to recommend for transmitting the message. Here, however, the determination is based on the alternate resource allocation mode determined at block 514, the reference signal (i.e., on the results of channel estimation), and the traffic parameters. The method 500 then proceeds to block 512 as discussed above and further below.

From block 512, the method 500 proceeds to block 518. At block 518, the UE 200 receives the message for which it determined transmission parameters. The message may be received using the recommended transmission parameters, or it may be received using a different set of transmission parameters if the transmitting device opted not to use the transmission parameters recommended by the UE 200.

Accordingly, the UE 200 may enable a UE to provide channel state feedback that is more tailored to the actually desired/useful targets for given traffic between wireless communications devices. Doing so may eliminate the need to engage in multiple requests and responses for transmission parameters for different traffic parameters, and may increase efficiency and reduce interference when optimizing resource block allocation and spatial domain use.

Figure 6:
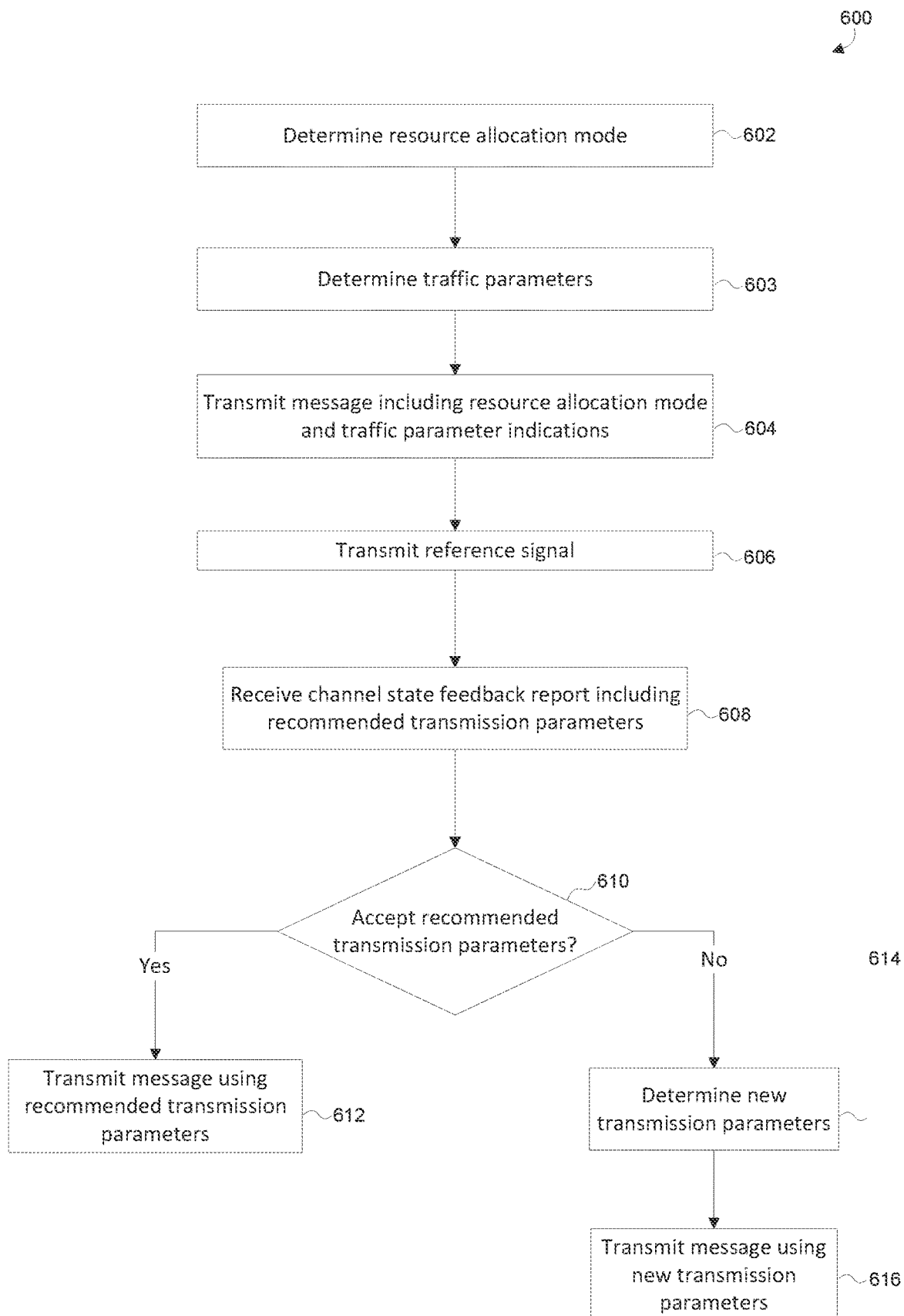
FIG. 6 is a flow diagram of a wireless communication method according to some embodiments of the present disclosure.

FIG. 6 is a flow diagram illustrating a wireless communication 600 method for determining transmission parameters for transmitting a message according to some embodiments of the present disclosure. Aspects of the method 600 can be executed by a wireless communication device, such as the BSs 105 and/or 300 utilizing one or more components, such as the processor 302, the memory 304, the transmission parameter configuration module 308, the transceiver 310, the modem 312, the one or more antennas 316, and various combinations thereof. As illustrated, the method 600 includes a number of enumerated steps, but embodiments of the method 600 may include additional steps before, during, after, and in between the enumerated steps. Further, in some embodiments, one or more of the enumerated steps may be omitted or performed in a different order.

At block 602, the BS 300 determines a resource allocation mode for use in determining the transmission parameters. The modes are detailed in the discussion of FIG. 3, and include a maximum-payload mode, where the objective is to maximize the payload size; a minimum-resource block mode, where the objective is to minimize the number of resource blocks selected for transmission; a minimum-carrier mode, where the objective is to minimize the number of component carriers activated for transmission (e.g., within a slot); a minimum-rank mode where the objective is the minimize the rank (i.e., number of spatial layers) used; a maximum-modulation and coding scheme (MCS) mode, where the objective is to maximize the MCS; a maximum-spectral efficiency mode, where the objective is to maximize the spectral efficiency, i.e., the number of bits per resource element; and a maximum-reliability mode, where the objective is to maximize the reliability of the transmission (e.g., by minimizing the BLER).

At block 603, the BS 300 determines traffic parameters for use in determining the transmission parameters. The traffic parameters include, for example, reliability, payload size, delivery deadline, and payload error rate targets. In some aspects, the BS 300 may determine the resource allocation mode and traffic parameters simultaneous (e.g., blocks 603 and 604 may be combined).

The BS 300 may also (or alternatively) determine an alternate mode of operation if a payload size target cannot be met using a given resource allocation mode within a single time frame (e.g., a slot). The alternate mode may include falling back to a maximum-payload mode. The alternate mode may also include transitioning to one of several multi-slot planning modes, where the transmission parameters are determined based on satisfying an objective over multiple slots. The multi-slot planning modes may include a minimum-payload error rate mode, where the objective is to minimize the probability of the payload not being delivered successfully within a deadline; a minimum-TB mode, where the objective is to minimize the number of TBs used during transmission of the message; and a minimum-delay mode, where the objective is to minimize the number of slots used for transmitting the message. Either way, the indications may be received as part of a part of a control signal, for example, a DCI message on the PDCCH or an RRC message, or a combination of the two.

At block 604, the BS 300 transmits indications specifying the resource allocation mode and traffic parameters to the UE 200. The transmission may also include the candidate set of resource blocks (e.g., explicitly signaled or implicitly) and/or an indication specifying an alternate resource allocation mode. The indications and candidate set of resource blocks may be transmitted as part of a part of a control signal, for example, a DCI message on the PDCCH or an RRC message, or a combination of the two. Moreover, the indications may be transmitted either with a small representation that the UE 200 may then use to index into a local table, or directly represented in the message.

At block 606, the BS 300 transmits at least one reference signal to UEs including the UE 200. The reference signal may be a CSI-RS or other reference signal suitable for use in DL channel estimation.

At block 608, the BS 300 receives from the UE 200 recommended transmission parameters. The recommended transmission parameters have been, according to embodiments of the present disclosure, determined based on the resource allocation mode and traffic parameters that the BS 300 determined at block 602, transmitted at block 604, and the reference signal(s) transmitted at block 606. The transmission parameters may include rank, MCS, sets of RBs, and/or sets of CCs. The various allocation modes and traffic and transmission parameters are detailed in the discussion of FIG. 3.

At decision block 610, the BS 300 determines whether to accept the recommended transmission parameters. If the BS 300 determines to use the recommended transmission parameters, the method proceeds to block 612.

At block 612, the BS 300 transmits the message to the UE 200 using the recommended transmission parameters.

Turning back to decision block 610, the BS 300 may determine not to accept the recommended transmission parameters. The BS 300 may reject the recommendation if, for example, the recommended parameters would negatively impact the BS 300's communications with other devices. If the BS 300 does not accept the recommended transmission parameters, the method proceeds to block 614.

At block 614, the BS 300 determines its own set of transmission parameters to use in place of the recommended parameters based on at least some aspects of the channel state feedback information received from the UE 200.

At block 616, the BS 300 transmits the message using the transmission parameters it determined at block 614, rather than the recommended transmission parameters received at block 608.

Further aspects of the present disclosure include the following:

1. A method of wireless communication, comprising:
   receiving, by a first wireless communications device, a resource allocation mode indication from a second wireless communications device;
   receiving, by the first wireless communications device, a traffic parameter indication from the second wireless communications device;
   selecting, by the first wireless communications device, a transmission parameter based on a reference signal, the resource allocation mode indication, and the traffic parameter indication; and
   transmitting, by the first wireless communications device, the transmission parameter to the second wireless communications device as part of a channel state feedback message.

2. The method of aspect 1, wherein the resource allocation mode indication corresponds to a single time frame comprising a single slot.

3. The method of aspect 2, wherein the resource allocation mode indication identifies a maximum-payload mode and the traffic parameter indicator identifies a reliability target, wherein the selecting further comprises:
   determining, by the first wireless communications device, a rank and modulation and coding scheme as the transmission parameter that maximizes a payload size subject to the reliability target.

4. The method of aspect 2, wherein the resource allocation mode indication identifies a minimum-resource block mode and the traffic parameter indicator identifies a payload size target and a reliability target, wherein the selecting further comprises:
   determining, by the first wireless communications device, a set of resource blocks, a rank, and a modulation and coding scheme as the transmission parameter that minimizes a number of resource blocks selected subject to the payload size target and the reliability target.

5. The method of aspect 2, wherein the resource allocation mode indication identifies a minimum-carrier mode and the traffic parameter indicator identifies a payload size target and a reliability target, wherein the selecting further comprises:
   determining, by the first wireless communications device, a set of component carriers as the transmission parameter that minimizes a number of component carriers selected subject to the payload size target and the reliability target.

6. The method of aspect 2, wherein the resource allocation mode indication identifies a minimum-rank mode and the traffic parameter indicator identifies a payload size target and a reliability target, wherein the selecting further comprises:
   determining, by the first wireless communications device, a rank and modulation and coding scheme as the transmission parameter that minimizes a rank subject to the payload size target and the reliability target.

7. The method of aspect 2, wherein the resource allocation mode indication identifies a maximum-reliability mode and the traffic parameter indicator identifies a payload size target, wherein the selecting further comprises:
   determining, by the first wireless communications device, a set of resource blocks, a rank, and a modulation and coding scheme as the transmission parameter that maximizes a reliability metric, subject to the payload size target.

8. The method of aspect 1, wherein the traffic parameter indication identifies a payload size target, the method further comprising:
   determining, by the first wireless communications device, that transmission according to the payload size target is unobtainable within a single time frame;
   and transitioning, by the first wireless communications device in response to the determining, to a multi-slot mode, wherein the selecting is based on the multi-slot mode.

9. The method of any of aspects 1-8, wherein the resource allocation mode indication and the traffic parameter indication are part of a downlink control information message.

10. The method of any of aspects 1-9, wherein the first wireless communications device comprises a user equipment and the second wireless communications device comprises a base station.
11. A method of wireless communication, comprising:
    transmitting, by a first wireless communications device, a resource allocation mode indication to a second wireless communications device;
    transmitting, by the first wireless communications device, a traffic parameter indication to the second wireless communications device;
    transmitting, by the first wireless communications device, a reference signal to the second wireless communications device; and
    receiving, by the first wireless communications device, a transmission parameter based on the reference signal, the resource allocation mode, and the traffic parameter indication, from the second wireless communications device.
12. The method of aspect 11, wherein the resource allocation mode indication corresponds to a single time frame comprising a single slot.
13. The method of aspect 12, wherein the resource allocation mode indication identifies a maximum-payload mode, the traffic parameter indicator identifies a reliability target, and the transmission parameter comprises a rank and modulation and coding scheme that maximizes a payload size subject to the reliability target.
14. The method of aspect 12, wherein the resource allocation mode indication identifies a minimum-resource block mode, the traffic parameter indicator identifies a payload size target and a reliability target, and the transmission parameter comprises a set of resource blocks, a rank, and a modulation and coding scheme that minimizes a number of resource blocks selected subject to the payload size target and the reliability target.
15. The method of aspect 12, wherein the resource allocation mode indication identifies a minimum-carrier mode, the traffic parameter indicator identifies a payload size target and a reliability target, and the transmission parameter comprises a set of component carriers as the transmission parameter that minimizes a number of component carriers selected subject to the payload size target and the reliability target.
16. The method of aspect 12, wherein the resource allocation mode indication identifies a minimum-rank mode, the traffic parameter indicator identifies a payload size target and a reliability target, and the transmission parameter comprises a rank and modulation and coding scheme that minimizes a rank subject to the payload size target and the reliability target.
17. The method of aspect 12, wherein the resource allocation mode indication identifies a maximum-reliability mode, the traffic parameter indicator identifies a payload size target, and the transmission parameter comprises a set of resource blocks, a rank, and a modulation and coding scheme that maximizes a reliability metric, subject to the payload size target.
18. The method of aspect 11, wherein the traffic parameter indication identifies a payload size target, and the transmission parameter is further based on a determination that the payload size target is unobtainable within in a single time frame.
19. The method of aspect 18, wherein the resource allocation mode indication identifies a minimum-transport block mode, the traffic parameter indicator identifies a payload size target and a reliability target, and the transmission parameter comprises a set of resource blocks, a rank, and a modulation and coding scheme for multiple transport blocks that minimizes a number of transport blocks, subject to the payload size target and the reliability target.
20. The method of aspect 18, wherein the resource allocation mode indication identifies a minimum-delay mode, the traffic parameter indicator identifies a payload size target and a payload error rate target, and the transmission parameter comprises a set of resource blocks, a rank, and a modulation and coding scheme for multiple transport blocks that minimizes a number of slots used for transmissions, subject to the payload size target and the payload error rate target.
21. The method of any of aspects 11-20, wherein the resource allocation mode indication and the traffic parameter indication are part of a downlink control information message.
22. The method of aspects 11-21, wherein the first wireless communications device comprises a base station and the second wireless communications device comprises a user equipment.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a first wireless communications device, a resource allocation mode indication from a second wireless communications device, wherein the resource allocation mode indication identifies a maximum-payload mode, a minimum-resource block mode, a minimum-carrier mode, a minimum-rank mode, a maximum-reliability mode, a maximum-modulation and coding scheme (MCS) mode, or a maximum-spectral efficiency mode;
receiving, by the first wireless communications device, a traffic parameter indication from the second wireless communications device that identifies one or more targets to meet in selecting a transmission parameter;
selecting, by the first wireless communications device, the transmission parameter based on a reference signal, the resource allocation mode indication, and the traffic parameter indication; and
transmitting, by the first wireless communications device, the transmission parameter to the second wireless communications device as part of a channel state feedback message.

2. The method of claim 1, wherein the resource allocation mode indication corresponds to a single time frame comprising a single slot.

3. The method of claim 2, wherein the resource allocation mode indication identifies the maximum-payload mode and the traffic parameter indicator identifies a reliability target, wherein the selecting further comprises:
determining, by the first wireless communications device, a rank and modulation and coding scheme as the transmission parameter that maximizes a payload size subject to the reliability target.

4. The method of claim 2, wherein the resource allocation mode indication identifies the minimum-resource block mode and the traffic parameter indicator identifies a payload size target and a reliability target, wherein the selecting further comprises:
determining, by the first wireless communications device, a set of resource blocks, a rank, and a modulation and coding scheme as the transmission parameter that minimizes a number of resource blocks selected subject to the payload size target and the reliability target.

5. The method of claim 2, wherein the resource allocation mode indication identifies the minimum-carrier mode and the traffic parameter indicator identifies a payload size target and a reliability target, wherein the selecting further comprises:
determining, by the first wireless communications device, a set of component carriers as the transmission parameter that minimizes a number of component carriers selected subject to the payload size target and the reliability target.

6. The method of claim 2, wherein the resource allocation mode indication identifies the minimum-rank mode and the traffic parameter indicator identifies a payload size target and a reliability target, wherein the selecting further comprises:
determining, by the first wireless communications device, a rank and modulation and coding scheme as the transmission parameter that minimizes a rank subject to the payload size target and the reliability target.

7. The method of claim 2, wherein the resource allocation mode indication identifies the maximum-reliability mode and the traffic parameter indicator identifies a payload size target, wherein the selecting further comprises:
determining, by the first wireless communications device, a set of resource blocks, a rank, and a modulation and coding scheme as the transmission parameter that maximizes a reliability metric, subject to the payload size target.

8. The method of claim 1, wherein the traffic parameter indication identifies a payload size target, the method further comprising:
determining, by the first wireless communications device, that transmission according to the payload size target is unobtainable within a single time frame;
and transitioning, by the first wireless communications device in response to the determining, to a multi-slot mode, wherein the selecting is based on the multi-slot mode.

9. The method of claim 1, wherein the resource allocation mode indication and the traffic parameter indication are part of a downlink control information message.

10. The method of claim 1, wherein the first wireless communications device comprises a user equipment and the second wireless communications device comprises a base station.

11. A method of wireless communication, comprising:
transmitting, by a first wireless communications device, a resource allocation mode indication to a second wireless communications device, wherein the resource allocation mode identifies a maximum-payload mode, a minimum-resource block mode, a minimum-carrier mode, a minimum-rank mode, a maximum-reliability mode, a maximum-modulation and coding scheme (MCS) mode, or a maximum-spectral efficiency mode;
transmitting, by the first wireless communications device, a traffic parameter indication to the second wireless communications device that identifies one or more targets to meet in selecting a transmission parameter;
transmitting, by the first wireless communications device, a reference signal to the second wireless communications device; and
receiving, by the first wireless communications device, the transmission parameter based on the reference signal, the resource allocation mode, and the traffic parameter indication, from the second wireless communications device.

12. The method of claim 11, wherein the resource allocation mode indication corresponds to a single time frame comprising a single slot.

13. The method of claim 12, wherein the resource allocation mode indication identifies the maximum-payload mode, the traffic parameter indicator identifies a reliability target, and the transmission parameter comprises a rank and modulation and coding scheme that maximizes a payload size subject to the reliability target.

14. The method of claim 12, wherein the resource allocation mode indication identifies the minimum-resource block mode, the traffic parameter indicator identifies a payload size target and a reliability target, and the transmission parameter comprises a set of resource blocks, a rank, and a modulation and coding scheme that minimizes a number of resource blocks selected subject to the payload size target and the reliability target.

15. The method of claim 12, wherein the resource allocation mode indication identifies the minimum-carrier mode, the traffic parameter indicator identifies a payload size target and a reliability target, and the transmission parameter comprises a set of component carriers as the transmission parameter that minimizes a number of component carriers selected subject to the payload size target and the reliability target.

16. The method of claim 12, wherein the resource allocation mode indication identifies the minimum-rank mode, the traffic parameter indicator identifies a payload size target and a reliability target, and the transmission parameter comprises a rank and modulation and coding scheme that minimizes a rank subject to the payload size target and the reliability target.

17. The method of claim 12, wherein the resource allocation mode indication identifies the maximum-reliability mode, the traffic parameter indicator identifies a payload size target, and the transmission parameter comprises a set of resource blocks, a rank, and a modulation and coding scheme that maximizes a reliability metric, subject to the payload size target.

18. The method of claim 11, wherein the traffic parameter indication identifies a payload size target, and the transmission parameter is further based on a determination that the payload size target is unobtainable within in a single time frame.

19. The method of claim 18, wherein the resource allocation mode indication identifies a minimum-transport block mode, the traffic parameter indicator identifies a payload size target and a reliability target, and the transmission parameter comprises a set of resource blocks, a rank, and a modulation and coding scheme for multiple transport blocks that minimizes a number of transport blocks, subject to the payload size target and the reliability target.

20. The method of claim 18, wherein the resource allocation mode indication identifies a minimum-delay mode, the traffic parameter indicator identifies a payload size target and a payload error rate target, and the transmission parameter comprises a set of resource blocks, a rank, and a modulation and coding scheme for multiple transport blocks that minimizes a number of slots used for transmissions, subject to the payload size target and the payload error rate target.

21. The method of claim 11, wherein the resource allocation mode indication and the traffic parameter indication are part of a downlink control information message.

22. The method of claim 11, wherein the first wireless communications device comprises a base station and the second wireless communications device comprises a user equipment.

23. A wireless communications device, comprising:
a transceiver configured to:
receive a resource allocation mode indication from a second wireless communications device, wherein the resource allocation mode identifies a maximum-payload mode, a minimum-resource block mode, a minimum-carrier mode, a minimum-rank mode, a maximum-reliability mode, a maximum-modulation and coding scheme (MCS) mode, or a maximum-spectral efficiency mode;
receive a traffic parameter indication from the second wireless communications device that identifies one or more targets to meet in selecting a transmission parameter; and
transmit the transmission parameter to the second wireless communications device as part of a channel state feedback message; and
a processor configured to:
select the transmission parameter based on a reference signal, the resource allocation mode indication, and the traffic parameter indication.

24. The wireless communications device of claim 23, wherein the resource allocation mode indication corresponds to a single time frame comprising a single slot.

25. The wireless communications device of claim 24, wherein the resource allocation mode indication identifies the maximum-payload mode, the traffic parameter indicator identifies a reliability target, and the processor is configured to select the transmission parameter by:
determining a rank and modulation and coding scheme as the transmission parameter that maximizes a payload size subject to the reliability target.

26. The wireless communications device of claim 24, wherein the resource allocation mode indication identifies the minimum-resource block mode, the traffic parameter indicator identifies a payload size target and a reliability target, and the processor is configured to select the transmission parameter by:
determining a set of resource blocks, a rank, and a modulation and coding scheme as the transmission parameter that minimizes a number of resource blocks selected subject to the payload size target and the reliability target.

27. A wireless communications device, comprising:
a processor; and
a transceiver configured to:
transmit a resource allocation mode indication to a second wireless communications device, wherein the resource allocation mode identifies a maximum-payload mode, a minimum-resource block mode, a minimum-carrier mode, a minimum-rank mode, a maximum-reliability mode, a maximum-modulation and coding scheme (MCS) mode, or a maximum-spectral efficiency mode;
transmit a traffic parameter indication to the second wireless communications device that identifies one or more targets to meet in selecting a transmission parameter;
transmit a reference signal to the second wireless communications device; and
receive the transmission parameter based on the reference signal, the resource allocation mode, and the traffic parameter indication, from the second wireless communications device.

28. The wireless communications device of claim 27, wherein the resource allocation mode indication corresponds to a single time frame comprising a single slot.

29. The wireless communications device of claim 28, wherein the resource allocation mode indication identifies the maximum-payload mode, the traffic parameter indicator identifies a reliability target, and the transmission parameter comprises a rank and modulation and coding scheme that maximizes a payload size subject to the reliability target.

30. The wireless communications device of claim 28, wherein the resource allocation mode indication identifies the minimum-resource block mode, the traffic parameter indicator identifies a payload size target and a reliability target, and the transmission parameter comprises a set of resource blocks, a rank, and a modulation and coding scheme that minimizes a number of resource blocks selected subject to the payload size target and the reliability target.

* * * * *